United States Patent [19]
Parks

[11] Patent Number: 5,893,572
[45] Date of Patent: Apr. 13, 1999

[54] TOOL CADDY

[76] Inventor: James E. Parks, 2426 24th La., Palm Beach Gardens, Fla. 33418

[21] Appl. No.: 08/777,617

[22] Filed: Dec. 31, 1996

[51] Int. Cl.$^6$ .............................. B62B 1/00; B62B 1/04; B62B 1/06; B62B 1/12
[52] U.S. Cl. .............................. 280/47.18; 280/47.26; 280/47.19; 280/47.28; D34/24
[58] Field of Search .............................. 280/47.26, 47.19, 280/47.18, 47.36, 47.27, 47.28; 296/22; D34/19, 12, 21, 24, 25

[56] References Cited

U.S. PATENT DOCUMENTS

| 957,406 | 5/1910 | Bjorklund | 280/47.27 |
| 3,436,093 | 4/1969 | Rufflet, Jr. | 280/47.27 |
| 4,864,334 | 9/1989 | Ellis | 280/47.26 |
| 4,998,742 | 3/1991 | Maynard . | |

*Primary Examiner*—Brian L. Johnson
*Assistant Examiner*—Faye M. Fleming
*Attorney, Agent, or Firm*—McHale & Slavin P.A.

[57] ABSTRACT

A portable workstation includes a storage structure and an integrated dolly. The storage structure resembles a generally-upright cabinet having a top platform with upward-folding expansion leaves. The storage structure is defined by a pair of vertical side walls spaced apart by a back wall. One fixed shelf and two folding shelves extend between the side walls. The shelves are useable as steps, but are securable in alternate, bin-forming positions. A box-storage chamber and flexible straps provide storage locations for tools. A wheeled dolly is attached to the storage structure by a pair of slide pins.

20 Claims, 3 Drawing Sheets

TOOL CADDY

FIELD OF THE INVENTION

This device relates to storage structures, and more particularly to a storage structure having a detachable, wheeled support.

BACKGROUND

Individuals who work with a variety of tools or similar working components often employ large storage or safe-keeping devices to keep their tools organized. In many instances, a tool-using homeowner will store tools in a large storage container located in an area of a home designated as a workroom. When repairs must be performed in other areas of the home, the homeowner must carry the tools needed to complete the task from the workroom to the other areas of the home.

Many tool users choose to transport tools in what is commonly termed a toolbox. Typically, toolboxes include a handle to help an individual carry the box, while providing numerous trays and section dividers to maintain tools in an orderly manner. However, while conventional toolboxes are suitable for transporting a moderate number of tools, their usefulness is limited by the strength of the individual carrying the toolbox. Because of their weight, large storage containers are not easily transportable. Individuals who wish to carry large numbers of tools or heavy items often require multiple toolboxes.

The use of wheels on a toolbox makes it possible to carry more tools or heavier tools. The attachment of wheels on the bottom corners of a toolbox makes moving the toolbox on a flat surface easier and further allows for increased toolbox size. However, increased toolbox size may create a storage problem in and of itself. More specifically, large storage structures may not be suitable for environments, like apartments, which have space constraints. Homeowners, apartment dwellers, and the like all have limited space available for tool-storage containers, because they must also provide space for other necessary items, such as ladders, work benches, dollys, stools and so forth.

Tools are used in most every household repair. As a result, many tool users must reach areas or objects which are elevated beyond normal reach. Individuals in those situations typically employ a ladder to reach their elevated targets. Alternatively, individuals without ladders may choose to climb upon their toolbox, a stool, or any available object, without regard to the item's ability to support the individual's weight. Unfortunately, ladders and toolboxes are not suitable for use as elevation platforms in many locations encountered by the handy man. Ladders contact the ground at discrete "footprint" location and are subject to unwanted movement when placed on uneven or polluted surfaces.

Additionally, tool users may need to bring a core set of tools to most tasks, while bringing additional tools for special jobs. Most currently-known toolboxes are customizable by adding rigid trays or boxes. Although this approach may increase storage capacity, it often hides or blocks groups of tools. This, in turn, may require removal of the extra trays or boxes when the blocked tools are needed. In jobs which require quick access to a variety of tools, the removal of trays or boxes may not be appropriate. The repair person may need a tabletop on which to perform work while moving heavy objects to complete a task.

A handy man needs to be prepared for any type of task, from repairing waterpipes to painting ceilings. For this reason, a handyman may choose to carry a ladder, a toolbox, a stool, a work bench, and a seat with him, just to be prepared. For example, without such exhaustive preparation, a handyman wishing to move a cabinet after painting it would have to first bring paint tools, return the paint tools, then obtain a dolly, and so forth. U.S. Pat. No. 4,998,742 illustrates a popular portable workbench which attempts to address the need for portability but fails to address the need for simultaneously providing a toolbox, a ladder, a work surface, and the like.

Accordingly, what is needed is a portable workstation that meets the needs of most handy men, by providing tool storage capabilities, a ladder, a seat, a dolly, and a workbench all in one easy-to-move, easy-to-store device.

SUMMARY OF THE INVENTION

The present invention is a portable workstation having foldable shelves, a detachable dolly, storage compartments, reinforced steps, and an extendable tabletop.

The storage structure resembles a generally-upright cabinet and includes a rectangular top platform that has foldable leaves. The vertical side walls extend downward from the lower surface of the top platform and have a contoured front edge that provides easy access to included shelving. Tool-holding straps are located on the outer side surface of each side wall. Locking support arms extend between the leaves and vertical side walls to releasably position the leaves in a horizontal orientation.

A back wall extends downward from the underside of the top platform and separates the vertical side walls. A flexible, tool-holding strap extends across the inner side surface of the back wall and extends forward onto the inner side surfaces of each side wall.

A bottom wall acts as a base for the storage structure with a pair of feet attached to the front edge of the bottom surface of the bottom wall.

A horizontal first support shelf extends between the inner side surface of each side wall. Together, the lower surface of the first support shelf, the inner side surface of each side wall and the upper surface of the bottom wall create a front-accessible chamber. The chamber is sized to fit rectangular storage boxes and a drawer-stop wall prevents loss of the storage box when the storage structure is tilted. A vertical drawer-stop wall extends between the lower surface of the first support shelf and the back edge of the bottom wall.

A pair of reinforcing plates extends vertically upward from the upper surface of the first support shelf. Each reinforcing plate lies against a corresponding inner side surface of a vertical side wall.

A second support shelf extends horizontally between the reinforcing plates and includes a movable panel that is attached by a hinge. Magnets located on the inner side surface of each reinforcing plate engage corresponding metal plates located on the movable panel. This engagement secures the movable panel in a raised orientation, allowing the first shelf to act as a support. The second support shelf, when lowered, and the first support shelf provide secure steps.

A third support shelf extends between the vertical side walls. Like the second support shelf, the third support shelf has a movable panel attached by a hinge to a fixed panel. Magnets located inside the vertical side walls engage metal plates on the third support shelf's moveable panel. This engagement secures the movable panel in a vertical position. When the third shelf's movable panel is lowered, it may be used as a step.

A front panel extends orthogonally downward from the plane of the second support shelf. The front panel connects the front edges of each vertical side wall. A drawer or storage container slides through an aperture in the front panel. The drawer may be moved by handle included on its front. A vertical drawer-stop wall extends between the lower surface of the first support shelf and the bottom wall of the storage structure.

A pair of pin-holding sleeves is located on the outer surface of the back wall. Each sleeve contains a securing pin that engages a corresponding pin-receiving aperture on the detachable dolly. When the pins engage the pin-receiving apertures, the dolly is securely latched to the storage structure, allowing the structure to be tilted onto the dolly wheels and moved.

The dolly has a generally-upright rectangular frame. It includes a pair of vertical beams each having a middle section, a top end and a bottom end. A top horizontal beam that has a centrally-located handle slot joins the top ends of the beams. A middle horizontal beam connects the middle sections of each vertical beam. A dolly-removal handle is located on the middle horizontal beam. The vertical beams have pin-receiving apertures that receive slide pins on the back wall of the storage structure. A horizontal lift plate extends forward from the dolly and slides under the storage structure. An axle extends between the lower ends of the vertical beams, with wheels mounted on the end of the axle. The wheels and lift plate provide rolling support of the storage structure.

Accordingly it is an objective of the present invention to provide a portable workstation having a detachable wheeled support.

Another objective of the present invention is to provide a portable workstation that includes steps and a planar base which allow an individual to climb to elevated heights, wherein at least one step creates a storage chamber.

Yet another objective of the present invention is to provide a portable workstation that has a work surface that is user-adjustable.

Yet still another objective of the present invention is to provide a portable workstation that has numerous storage locations for tools, including a concealed chamber and easily-accessible straps.

It is an additional objective of the present invention to provide a storage-container holding chamber which holds containers securely when the storage structure is tilted.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
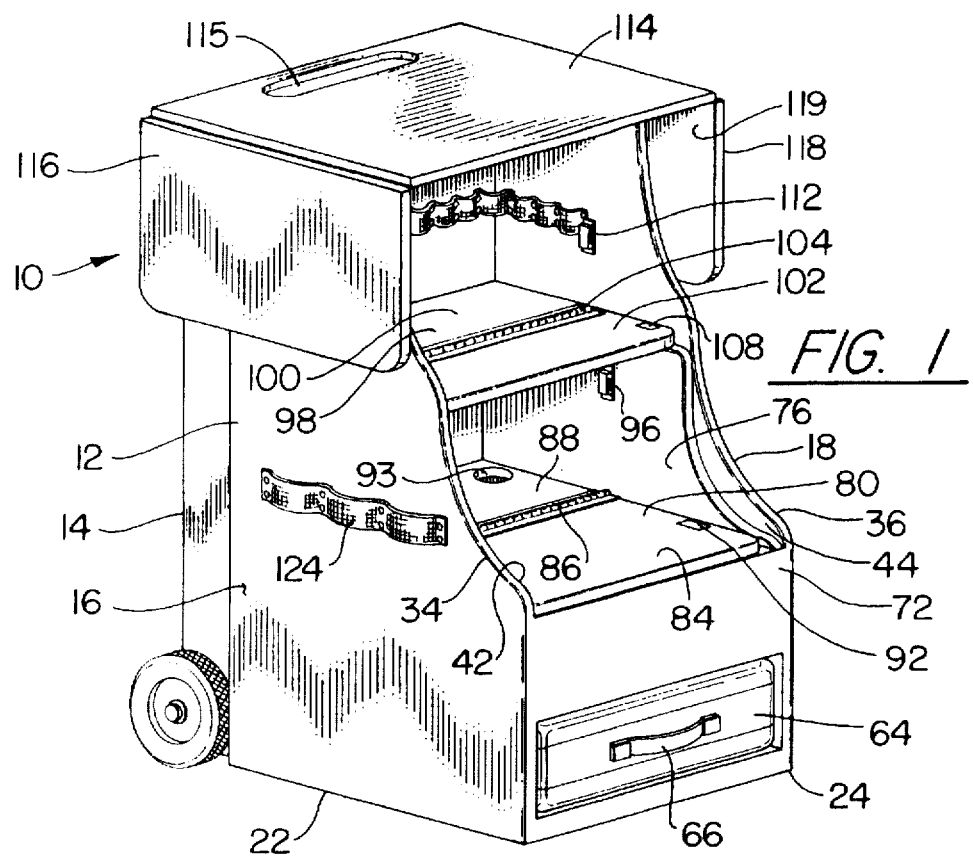
FIG. 1 is a perspective view of a portable workstation according to the present invention.

Reference is now made to FIG. 1, wherein a portable workstation 10 according to the present invention is illustrated. The workstation 10 includes a generally-upright storage structure 12 and an integrated dolly 14. Although the dolly 14 is an integral part of the portable workstation 10, it may be detached from the storage structure 12.

The storage structure 12 is defined by a first planar side wall 16 and a second planar side wall 18, which are spaced apart by a rectangular back wall 20. The first planar side wall 16 and second planar side wall 18 each have a bottom edge 22,24, a back edge 26,28 (shown in FIG. 3), a top edge and a front edge 34, 36. The rectangular back wall 20 has side edges 38,40 (shown in FIG. 3) which abut the inner side surface 42,44 of each planar side wall 16,18. The rectangular back wall 20 has a different height than the planar side walls 16,18. While the top edge 46 (shown in FIG. 4) of the rectangular back wall 20 and the upper edge 48,50 of each planar side wall 16,18 share the same plane, the bottom edge 52 of the rectangular back wall 20 is raised above the bottom edge 22,24 of each planar side wall 16,18. Each planar side wall 16,18, has an inner side surface 42,44. A vertical drawer-stop wall 69 extends from the lower side surface 68 of the first support shelf 62 to the back edge of the bottom wall 54. A horizontal bottom wall 54 extends between the inner side surface 42, 44 of each planar side wall 16,18. The bottom wall has an upper side surface 56 and an opposite bottom side surface 58. The bottom side surface 58 of the bottom wall 54 is coplanar with the bottom edge 22,24 of each planar side wall 16,18.

Figure 2:
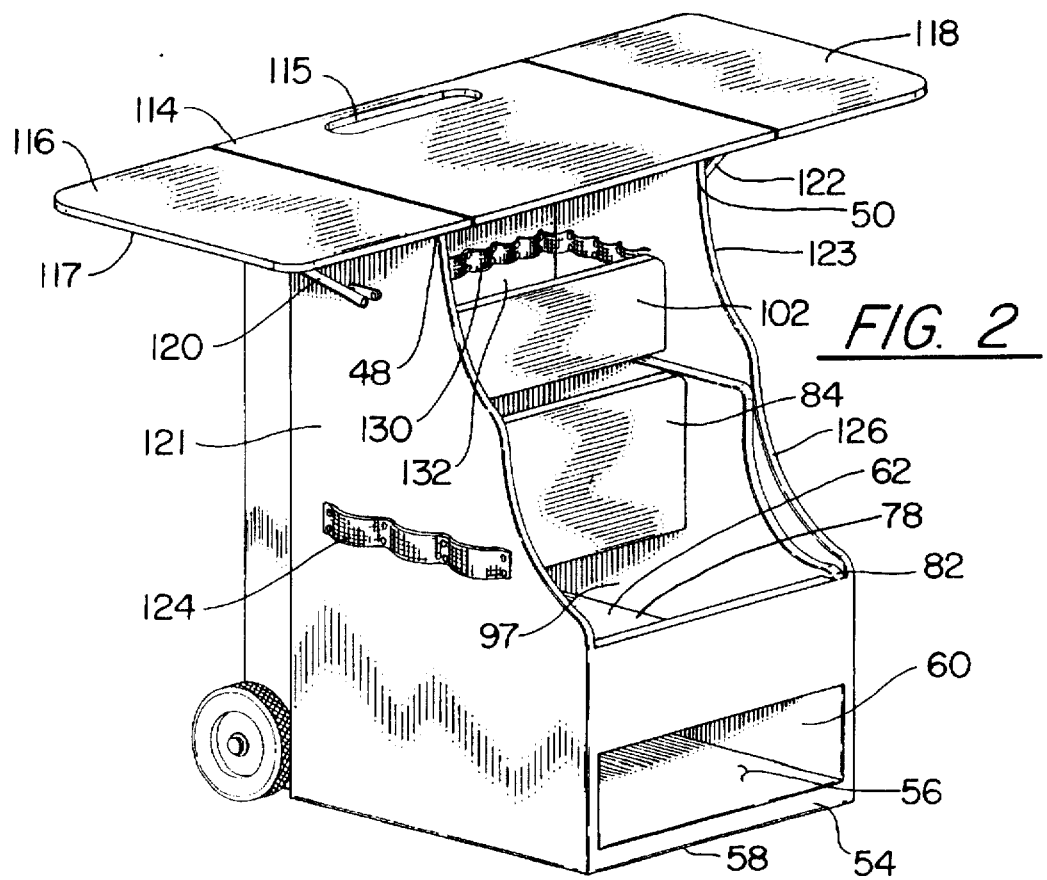
FIG. 2 is perspective view of the portable workstation according to the present invention with the leaves of the top platform raised and the shelves rotated upward.
Figure 5:
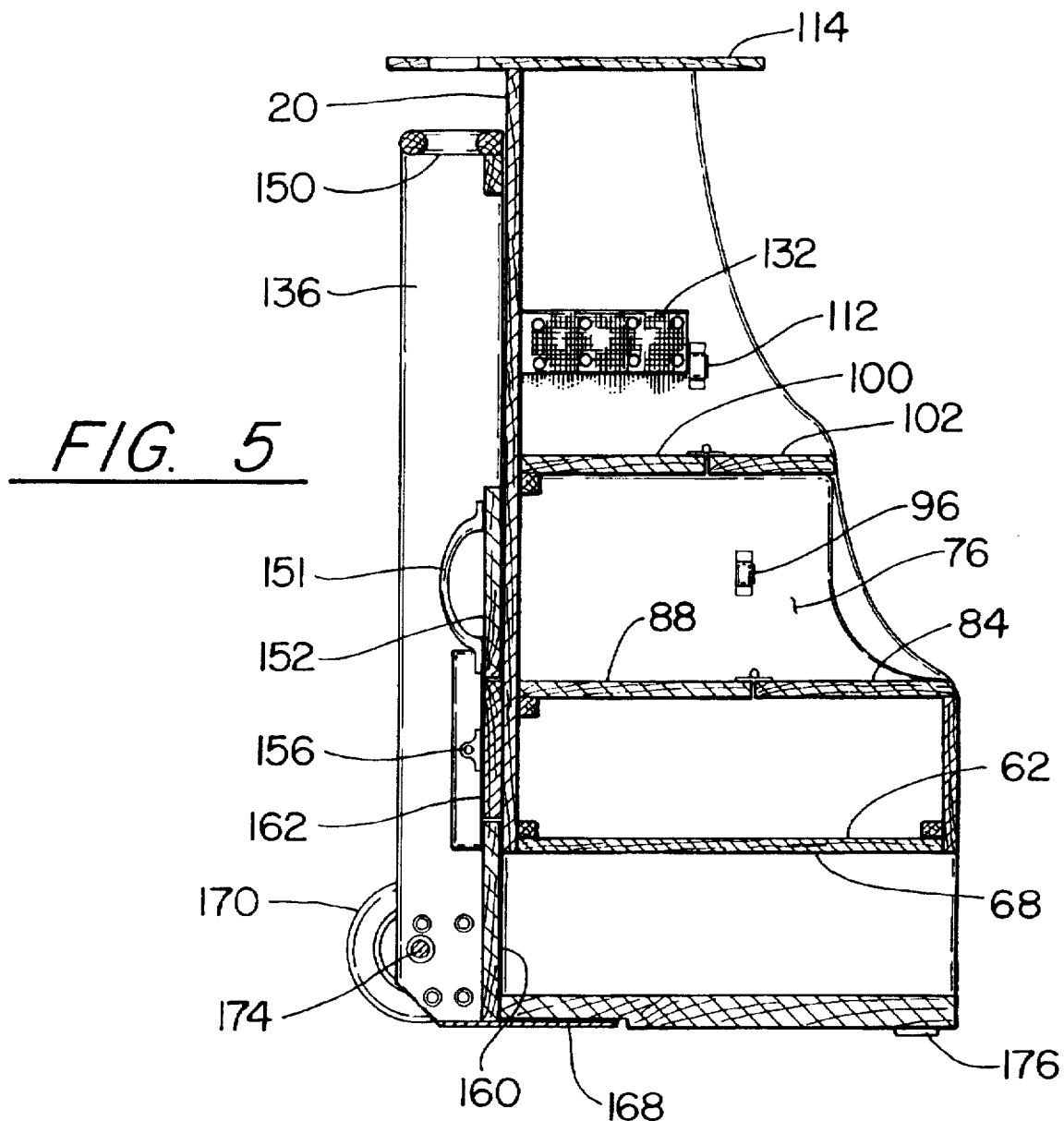
FIG. 5 is a cross-section view of the side elevation view shown in FIG. 4.

With reference to FIGS. 1 and 2, a box-storage chamber 60 is formed from the inner side surface 42, 44 of each planar side wall 16,18, the upper side surface 56 of the bottom wall, and the lower side surface 68 (shown in FIG. 5) of a first support shelf 62. The box-storage chamber 60 is sized to accommodate a rectangular storage box or drawer 64. A drawer strap 66 may be fastened to the front of the drawer 64 to ease sliding motion of the drawer within the box-storage chamber 60. A front wall 72 extends between a portion of the front edge 34,36 of each planar side wall 16,18. The front wall 72 has an opening sized to accommodate the drawer 64. The front wall 72 extends up from the plane of the bottom wall 54. The front wall 72 has a different height than the planar side walls 16,18. In the preferred embodiment, the height of the front wall 72 is approximately one-third the height of the planar side walls 16,18.

A pair of step-reinforcing plates 76 extends upward from the upper side surface 78 of the first support shelf 62. Both plates are identical and only one plate 76 is shown to maintain clarity of the drawings. Each step-reinforcing plate 76 lies against the inner side surface 42, 44 of each planar side wall 16,18.

Referring still to FIGS. 1 and 2, a second support shelf 80 extends between the step-reinforcing plates 76. The major plane of the second support shelf is coplanar with the upper edge 82 of the front wall 72. The second support shelf 80 has a movable panel 84 which is attached by a hinge 86 to a second support shelf fixed panel 88. The movable panel 84 rests on the top edge of the front wall 72. A pair of metallic plates 92 is located on the side edges 40 of the second support shelf 80. Corresponding magnets 96 are disposed on each step-reinforcing plate 76. Only one second-shelf metallic plate 92, side 40, and magnet are shown to maintain readability of the drawing, but an identical pair of each exists. The movable panel 84 folds along the hinge 86 and creates a bin 97 formed by the top surface of the first support shelf 62 and the inner surface of each said planar side wall 16, 18. The movable panel 84 may be folded upward until the metallic plates 92 engage the magnets 96 and secure the second support shelf's 80 movable panel 84 in an upward or vertical position. The fixed panel 88 of the second support shelf contains a through hole 93, which allows items to pass through the fixed panel 88 of the second support shelf 80.

A third support shelf 98 is disposed between the inner side surface 42, 44 of each planar side wall 16, 18. The third support shelf 98 is reinforced by the step-reinforcing plates 74,76 (only 76 is shown). Like the second support shelf 80, the third support shelf 98 has a fixed panel 100 and a movable panel 102 which are connected by a hinge 104. Metallic plates 108 are located on the edges of the movable panel 102. Corresponding securing magnets 112, are located on the inner side surface 42, 44 of each planar side wall 16, 18. The movable panel 102 may be folded upward until the metallic plates 108 engage the magnets 112, and secure the third support shelf's 98 movable panel 102 in an upward or vertical position. Although only one third-shelf metallic plate 108 and magnet 112 are shown, an identical pair of each exists.

A top platform 114 is secured to the top edge 46 of the back wall 20 and the upper edge 48,50 of each planar side wall 16, 18. A hand hole 115 is provided for use in tilting the workstation for purposes of relocation. The top platform 114 has a pair of foldable leaves 116, 118 which are attached to side edges thereof. Each foldable leaf has a lower surface 117,119. With reference to FIG. 2, lockable support arms 120,122 extend between each the lower surface 117,119 of each foldable leaf 116,118 and the outer surface 121,123 of each planar side wall 16, 18. A user may use the support arms 120,122 to selectively place one or both of the foldable leaves 116, 118 in a substantially-horizontal orientation.

Outer flexible straps 124, 126 are permanently attached to the outer side surface 130 of each planar side wall 16, 18. A horizontal inner flexible strap 132 is permanently attached to the inner surface 132 of the back wall 20. The inner flexible strap extends onto the inner side surface 42, 44 of each planar side wall 16, 18.

Figure 3:
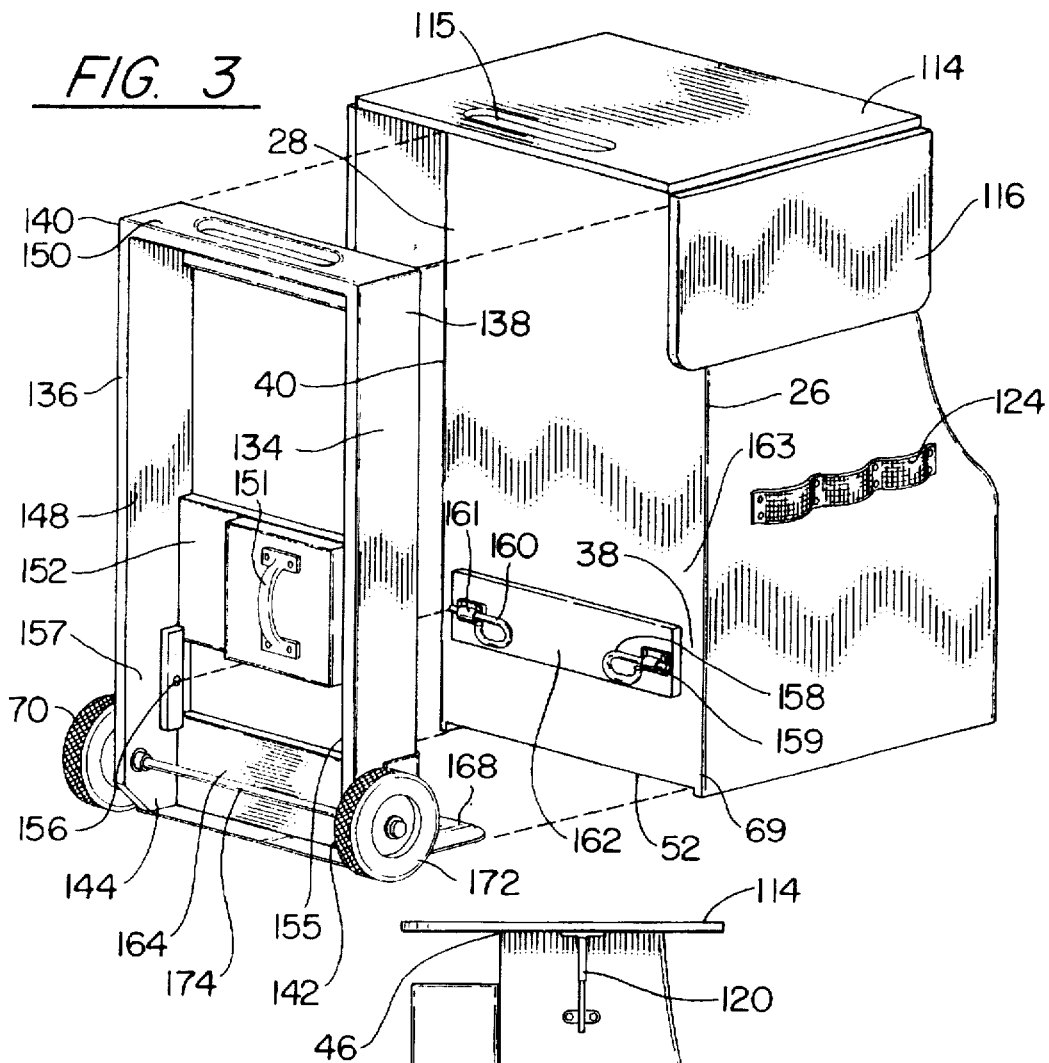
FIG. 3 is back perspective view of the portable workstation according to the present invention, showing the dolly detached.

With reference to FIG. 3, the integrated dolly 14 resembles a generally-upright, rectangular frame. The dolly 14 has a pair of vertical side beams 134,136. Each vertical side beam 134,136 has a top end 138,140 and a bottom end 142,144 and a middle portion 146,148. A top beam 150 connects the top end 138,140 of each vertical side beam 136,136. The top beam 150 includes a hand hole shaped to accommodate the hand of an individual. A middle beam 152 extends between the middle portions 146,148 of each vertical side beam 134, 136. A separation handle 151 is located on the middle beam 152. A pair of pin-receiving apertures 154, 156 is located on the inner side surface 155,157 of each vertical side beam 134, 136. Corresponding slide pins 158, 160 are mounted within sleeves 159,161. The sleeves 159, 161 are attached to a mounting plate 162. The mounting plate 162 is located on the outer surface 163 of the back wall 20 of the storage structure 12. The slide pins 158,160 are positioned to slide into the pin-receiving apertures 154, 156, releasably securing the dolly 14 to the storage structure 12.

Figure 4:
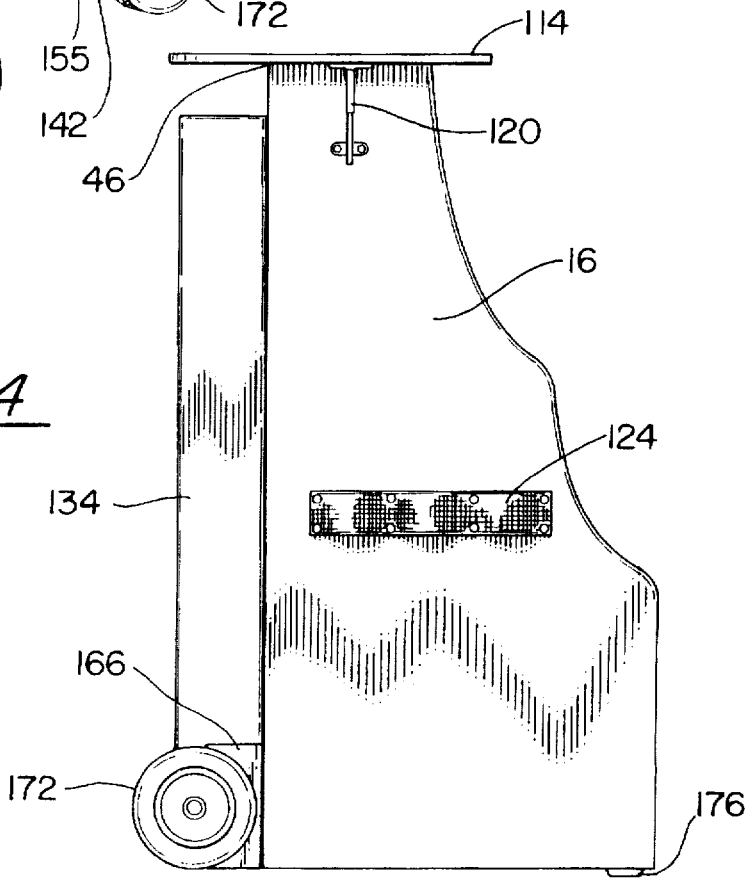
FIG. 4 is a side elevation view of the portable workstation according to the present invention.

A rigid plate 164 having a L-shaped cross-section is attached to the bottom end 142,144 of each vertical side beam 134, 136. An upright portion 166 of the plate 164 extends vertically along the vertical side beams 134,136. A substantially-horizontal portion 168 of the plate extends forward and comes to rest under the storage structure 12 when the dolly 14 is secured to the storage structure 12. Bolts may be used to secure the horizontal plate 164 to the vertical side beams 134,136. A pair of wheels 170,172 is mounted on an axle 174, to allow rolling motion of the portable workstation 10. As shown in FIG. 4, a pair of rubber feet 176 is disposed under the bottom wall 54.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

I claim:

1. A portable workstation having an integrated dolly, said workstation comprising:

a storage structure defined by a first planar side wall having an inner side surface and an outer side surface with a horizontal bottom edge, a vertical back edge, a horizontal top edge, and a contoured front edge; a second planar side wall forming a mirror image of said first planar side wall is spaced apart from said first planar side wall a predetermined distance by a rectangular back wall coupled to said back edge of each said planar side wall, said rectangular back wall having a bottom edge raised a fixed distance above the bottom edge of each said planar side wall; a bottom wall secured to each said bottom edge of each said planar side wall; a front wall extending along a portion of each said front edge of each planar side wall;

a first support shelf disposed between said planar side walls;

a second support shelf disposed a fixed distance upon said first support shelf;

a top platform disposed upon said second support shelf and attached to said top edge of each said planar side wall; and a dolly releasably secured to said storage structure.

2. The portable workstation according to claim 1 including a storage chamber formed by a portion of said inner surface of each said planar side wall, the top surface of said bottom wall and the bottom surface of said first support shelf.

3. The portable workstation according to claim 2 wherein said storage chamber is sized for slidable removal of conventional storage containers.

4. The portable workstation according to claim 1 wherein a portion of said second support is movable from a horizontal position to a vertical position along a hinge member allowing for foldable movement thereof, whereby placement of said movable portion in a horizontal position forms a step and in a raised position allows for ease of access to said first support shelf.

5. The portable workstation according to claim 1 including a third support shelf, said third support shelf having a portion thereof movable from a horizontal position to a vertical position along a hinge member allowing for foldable movement thereof, whereby placement of said movable portion in a horizontal position forms a step and in a raised position allows for ease of access to said second support shelf.

6. The portable workstation according to claim 4 or 5 including a means for reinforcing the horizontal position of said movable portion of said support shelf to transfer weight applied to each support shelf to said side planar walls.

7. The portable workstation according to claim 6 wherein said second support shelf forms a cover for a concealed bin storage area, said bin storage area defined by said top surface of said first support shelf and said inner surface of each said planar side wall.

8. The portable workstation according to claim 1 including a securing means for securing said second and third support shelves in a raised position.

9. The portable workstation according to claim 1 wherein said second support shelf includes at least one through hole for placement of work tools.

10. The portable workstation according to claim 1 wherein said top platform includes at least one foldable leaf section for extending the horizontal length of said platform.

11. The portable workstation according to claim 10 including a locking means for securing said foldable leaf section in a horizontal position.

12. The portable workstation according to claim 1 wherein said dolly includes vertical side beams operatively associated with said back wall of said storage structure.

13. The portable workstation according to claim 12 wherein said dolly includes a rigid plate extending orthogonally from a plane passing through both of said vertical side beams.

14. The portable workstation according to claim 1 wherein said dolly includes a centrally-disposed handle for ease of leveraged removal from said storage structure.

15. The portable workstation according to claim 1 including a latch means for releasably securing said dolly to said rectangular back wall of said storage structure.

16. The portable workstation according to claim 15 wherein said latch means is defined as a slide pin for securing to said back wall which engages at least one pin-receiving aperture disposed on said dolly.

17. The portable workstation according to claim 1 including at least one flexible strap located on said side wall for supporting work tools.

18. A portable workstation having an integrated dolly, said workstation comprising:

a storage structure defined by a first planar side wall having an inner side surface and an outer side surface with a horizontal bottom edge, a vertical back edge, a horizontal top edge, and a contoured front edge; a second planar side wall forming a mirror image of said first planar side wall is spaced apart from said first planar side wall a predetermined distance by a rectangular back wall coupled to said back edge of each said planar side wall, said rectangular back wall having a bottom edge raised a fixed distance above the bottom edge of each said planar side wall; a bottom wall secured to each said bottom edge of each said planar side wall; a front wall extending along a portion of each said front edge of each planar side wall;

a first support shelf disposed between said planar side walls;

a second support shelf disposed a fixed distance upon said first support shelf, said second support is movable from a horizontal position to a vertical position along hinge member allowing for foldable movement thereof;

a third support shelf disposed a fixed distance upon said second support shelf, said third support is movable from a horizontal position to a vertical position along hinge member allowing for foldable movement thereof;

means for securing said second and third support shelves in a raised position;

a top platform disposed upon said second support shelf and attached to said top edge of each said planar side wall, said top platform includes at least one foldable leaf section for extending the horizontal length of said platform; and a dolly releasably secured to said storage structure.

19. The portable workstation according to claim 18 wherein said second support shelf forms a cover for a concealed bin storage area, said bin storage area defined by said top surface of said first support shelf and said inner surface of each said planar side wall.

20. The portable workstation according to claim 18 including a locking means for securing said foldable leaf section in a horizontal position.

* * * * *